United States Patent
Beddus et al.

(10) Patent No.: US 11,620,145 B2
(45) Date of Patent: Apr. 4, 2023

(54) CONTAINERISED PROGRAMMING

(71) Applicant: BRITISH TELECOMMUNICATIONS PUBLIC LIMITED COMPANY, London (GB)

(72) Inventors: Simon Beddus, London (GB); Claudia Cristina, London (GB); Fadi El-Moussa, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 569 days.

(21) Appl. No.: 16/620,113

(22) PCT Filed: May 11, 2018

(86) PCT No.: PCT/EP2018/062273
§ 371 (c)(1),
(2) Date: Dec. 6, 2019

(87) PCT Pub. No.: WO2018/224243
PCT Pub. Date: Dec. 13, 2018

(65) Prior Publication Data
US 2020/0183716 A1    Jun. 11, 2020

(30) Foreign Application Priority Data
Jun. 8, 2017   (EP) .................................... 17175106

(51) Int. Cl.
*G06F 9/455*    (2018.01)
*H04L 9/40*     (2022.01)

(52) U.S. Cl.
CPC ...... *G06F 9/45512* (2013.01); *H04L 63/1458* (2013.01); *H04L 63/205* (2013.01)

(58) Field of Classification Search
None
See application file for complete search history.

(56) References Cited

U.S. PATENT DOCUMENTS 7,640,591 B1    12/2009  Tripathi et al.
7,657,868 B2 *   2/2010  Shenfield .................. G06F 8/20
                                                    717/121

(Continued)

FOREIGN PATENT DOCUMENTS

WO    2015197564    12/2015
WO    2018/224242   12/2018

OTHER PUBLICATIONS

Chelladhurai Jeeva et al: "Securing Docker Containers from Denial of Service (DoS) Attacks", 2016 IEEE International Conference on Services Computing (SCC), IEEE, Jun. 27, 2016 (Jun. 27, 2016), pp. 856-859, XP032953870.

(Continued)

*Primary Examiner* — Arezoo Sherkat
(74) *Attorney, Agent, or Firm* — Nixon & Vanderhye P.C.

(57) ABSTRACT

Containerised computing processes are generated by an orchestration processor interpreting user commands and user profile data to build a deployment specification specifying functions to be run by a containerised process, using a shell script run on a host virtualisation container. External events such as security threats and computing resource overloads can be used to generate the virtualised process, allowing vulnerability detection, and apply countermeasures such as deployment or migration of containers during attacks to lesser prone infrastructure, and allows the orchestration of non-container tools to provide security and resilience.

16 Claims, 3 Drawing Sheets

(56) References Cited

U.S. PATENT DOCUMENTS

| | | | | |
|---|---|---|---|---|
| 7,895,566 | B2* | 2/2011 | Shenfield | G06F 8/20 |
| | | | | 717/106 |
| 9,122,562 | B1 | 9/2015 | Stickle | |
| 9,276,816 | B1 | 3/2016 | Conte et al. | |
| 9,432,331 | B1 | 8/2016 | Shavell et al. | |
| 9,531,745 | B1* | 12/2016 | Sharma | G06F 40/205 |
| 9,544,327 | B1* | 1/2017 | Sharma | G06N 20/00 |
| 10,083,025 | B2* | 9/2018 | Weber | G06F 11/3668 |
| 10,685,115 | B1* | 6/2020 | Lieberman | H04L 63/1416 |
| 11,055,273 | B1* | 7/2021 | Meduri | G06F 16/2358 |
| 2006/0236401 | A1 | 10/2006 | Fosdick | |
| 2007/0214505 | A1 | 9/2007 | Stavrou et al. | |
| 2009/0222880 | A1 | 9/2009 | Mayer et al. | |
| 2010/0186009 | A1* | 7/2010 | Sen | G06F 8/61 |
| | | | | 717/174 |
| 2014/0047439 | A1 | 2/2014 | Levy et al. | |
| 2014/0122670 | A1 | 5/2014 | Levy et al. | |
| 2015/0103113 | A1 | 4/2015 | Monclus et al. | |
| 2016/0164911 | A1 | 6/2016 | Karasaridis | |
| 2016/0180096 | A1* | 6/2016 | Sharma | G06F 21/577 |
| | | | | 726/25 |
| 2016/0283713 | A1 | 9/2016 | Brech et al. | |
| 2017/0034023 | A1* | 2/2017 | Nickolov | H04L 43/0817 |
| 2017/0054759 | A1 | 2/2017 | Lee et al. | |
| 2017/0111236 | A1 | 4/2017 | Bielenberg et al. | |
| 2017/0126736 | A1 | 5/2017 | Urias et al. | |
| 2017/0257432 | A1* | 9/2017 | Fu | G06F 9/5072 |
| 2018/0167487 | A1 | 6/2018 | Vyas et al. | |
| 2018/0324204 | A1* | 11/2018 | McClory | G06F 9/5027 |
| 2019/0058722 | A1 | 2/2019 | Levin | |
| 2020/0117434 | A1* | 4/2020 | Biskup | G06F 9/445 |

OTHER PUBLICATIONS

Combe Theo et al: "To Docker or Not to Docker: A Security Perspective", IEEE Cloud Computing, IEEE, USA, vol. 3, No. 5, Sep. 1, 2016, pp. 54-62, XP011634100.

Amith Raj MP et al: "Enhancing security of Docker using Linux hardening techniques", 2016 2nd International Conference on Applied and Theoretical Computing and Communication Technology (ICATCCT), IEEE, Jul. 21, 2016, pp. 94-99, XP033089044.

Bill Karakostas: "Towards Autonomic Cloud Configuration and Deployment Environments", 2014 International Conference on Cloud and Autonomic Computing, Sep. 1, 2014 (Sep. 1, 2014), pp. 93-96, XP055395500.

N Van Rossem Steven et al: "NFV service dynamicity with a DevOps approach: Insights from a use-case realization", 2017 IFIP/IEEE Symposium on Integrated Network and Service Management (IM), IFIP, May 8, 2017, pp. 674-679, XP033127640.

Examination Report dated Dec. 16, 2021 issued in European Application No. 18 722 083.5 (8 pages).

Exam Report dated Mar. 2, 2022 issued for European Application No. 18 722 082.7 (6 pages).

Extended European Search Report for EP Application No. 17175106.8 dated Aug. 14, 2017, 10 pages.

Search Report for GB Application No. 1709133.1 dated Nov. 24, 2017, 1 page.

International Search Report for PCT/EP2018/062273 dated Aug. 23, 2018, 4 pages.

Written Opinion of the ISA for PCT/EP2018/062273 dated Aug. 23, 2018, 10 pages.

Steven J. Vaughan-Nichols, "Containers v Virtual machines—How to tell which is the right choice for your enterprise", Apr. 28, 2015, 5 pages.

Extended European Search Report for EP Application No. 17175111.8 dated Nov. 23, 2017, 14 pages.

Search Report for GB Application No. 1709161.2 dated Nov. 13, 2017, 1 page.

International Search Report for PCT/EP2018/062272 dated Aug. 7, 2018, 5 pages.

Written Opinion of the ISA for PCT/EP2018/062272 dated Aug. 7, 2018, 6 pages.

Van Rossem Steven, et al.: "NFV Service Dynamicity with a DevOps Approach: Insights from a Use-case Realization", 2017 IFIP/IEEE Symposium ON Integrated, Network and Service Management (IM), IFIP, May 8, 2017 (May 8, 2017), (6 pages).

Bill Karakostas: "Towards Autonomic Cloud Configuration and Deployment Environments", 2014 International Conference on Cloud and Autonomic Computing, Sep. 1, 2014 (Sep. 1, 2014), (4 pages).

Amith Raj MP, et al.: "Enhancing security of Docker using Linux Hardening Techniques", 2016 $2^{nd}$ International Conference on Applied and Theoretical Computing and Communication Technology (ICATCCT), IEEE, Jul. 21, 2016 (Jul. 21, 2016), (6 pages).

Combe Theo, et al.: "To Docker or Not to Docker: A Security Perspective", IEEE Cloud Computing, IEEE, USA, vol. 3, No. 5, Sep. 1, 2016 (Sep. 1, 2016) (9 pages).

Chflladhurai Jeeva, et al.: "Securing Docker Containers from Denial of Service (DoS) Attacks", 2016 IEEE International Conference on Services Computing (SCC), IEEE, Jun. 27, 2016 (Jun. 27, 2016), pp. 856-859, (4 pages).

European Examination report issued in EP Application No. 18722082. 7, dated Dec. 22, 2020.

U.S. Appl. No. 16/620,080 to Beddus, et al., filed Dec. 6, 2019 entitled"Denial of Service Mitigation" (18 pages).

U.S. Appl. No. 10/298,577, filed May 2019, Aithal et al.

Office Action dated May 11, 2022 issued in U.S. Appl. No. 16/620,080 (10 pages).

* cited by examiner

CONTAINERISED PROGRAMMING

This application is the U.S. national phase of International Application No. PCT/EP2018/062273 filed May 11, 2018 which designated the U.S. and claims priority to EP Patent Application No. 17175106.8 filed Jun. 8, 2017, the entire contents of each of which are hereby incorporated by reference.

BACKGROUND AND SUMMARY

This invention relates to the management of computer server systems, and in particular to the use of a "container" server architecture. Container technology allows multiple applications to run on a common operating system, but each operates inside its own isolated environment with only software components and libraries it requires, packaged in a standardised way. Using containers results in smaller applications, which are quicker to download, and use less of the system's resources. This approach means applications will be more efficient, lightweight and portable between different operating systems. Container technology is often compared to virtual machines (VM). Virtualisation enables multiple operating systems and applications to run on the same physical hardware. A hypervisor, an emulation of the actual physical hardware, allows slicing of compute, storage and network for each VM. However, each VM has a complete operating system which means it is large in size (Gigabytes), uses up many system resources and can take long to start-up.

The usage of containerised applications requires no virtualisation of the hardware as they only abstract the operating system kernel. This makes containers more efficient, faster to implement and more portable than virtual machines.

The use of "Container" technology to run services and applications is becoming increasingly common due to its flexibility, packing density, portability across systems, and ease of deployment and configuration.

A drawback of container technology is that containers are not completely isolated and secure when deployed. Container technologies such as "Docker" use kernel namespaces to provide a level of isolation, but they do not namespace all the resources. For example, the user namespace is disabled by default in container deployments which results in the container running the same namespace as its host. This leads to containers having full privileges when accessing the host's directories. When namespaces are enabled, containers run in their own namespace, rather than defaulting to that of the host, and are thus isolated from the host's namespace and so are not allowed to access important system directories.

Another security flaw in containers is the default ability to use all the resources of the host (such as memory and CPU). This is a problem because container applications run on the same kernel resources, so if an individual container consumes too much memory, as it would during a DDoS attack, it will starve any other applications running on the host.

A number of container monitoring tools exist that allow specification of monitoring configuration, such as Data Dog, Sysdig, Prometheus and Sensu.

Network virtualisation originally used virtual machines but now increasingly uses container technology (due to better packing density). Given that networking may often be a core business, it is critical that best of breed security and ease of provisioning (through orchestration) and operations are both safe and efficient. Applicant's invention through the use of standard APIs allows security countermeasures to be deployed seamlessly (and if necessary secretly) to vendors containers.

The container concept allows applications and their libraries to be run with a degree of isolation on the same operating system. This approach provides a much higher packing density of applications per physical server than virtualisation or indeed the traditional operating system and application model. It also enables much better portability between different operating systems and their flavours i.e. (Ubuntu, Centos, MacOS, Mint etc). The container requires only the application and necessary libraries to run. The container approach results in smaller applications, (low 10s of MB)), quicker to download, use less resources and very fast to start up sometime in the 10s of milliseconds.

At present, there is no platform that can automatically orchestrate secure and efficient computing containers based on policy, infrastructure load and security threats. At the same time, container technologies lack certain security and network features that can make deployment insecure.

However, the containers all share the same operating system and as such the isolation between containers is reduced, thus increasing the security threat. Container features such as 'user namespaces and control groups can be set to increase the isolation between containers, but they require a detailed knowledge of container technology that is unlikely in the average user. At the same time, there are problems in the area of network management and encryption that make the efficient and secure deployment of container onerous if not impossible. There are a number of companies that provide container orchestration solutions that include companies such as Docker, Kubernetes, Cloudsoft and Rancher. They effectively provide low-level tools that interpret a range of user generated instructions to build applications designed to respond to issues such as security threats or network requirements. However, these requirements must be specified by the user at the time the application is built. If a new threat is subsequently identified, the user has to instruct the containerisation process to build a new application. An example of this approach is discussed by Steven van Rossem et al in an article "NFV service dynamicity with a DevOps approach: Insights from a use-case realisation" (*IFIP/IEEE Symposium on Integrated network and service management*" 8 May 2017, pages 674-679) According to one aspect of the invention there is provided an orchestrator for containerised processes, comprising a specification compiler, for interpreting user inputs and user profile data retrieved from a data store, to compile a deployment specification specifying functions to be run by a containerised process, an orchestration processor to generate a shell script comprising instructions to perform a containerised process having the functions specified by the specification compiler and a virtualisation agent to run the shell script instructions on a host virtualisation container, the host virtualisation container comprising computer resources associated with the orchestrator an event interpreter responsive to inputs relating to external events, wherein the orchestration processor is responsive to the event interpreter to modify the shell script subsequent to initial deployment in accordance with the external inputs to adapt the containerised process A second aspect provides a method of operating a computerised system to generate a containerised processing function, in which:

user commands and user profile data are interpreted to build a deployment specification specifying functions to be run by a containerised process, a shell script is generated comprising instructions to perform a containerised process having the functions specified in the deployment specification and the shell script is run on a host virtualisation container to run the containerised process, wherein the shell script is modified by an orchestration processor to modify the containerised process subsequent to initial deployment in response to inputs relating to external events Inputs are responsive to security threats, and the orchestration processor generates a shell script providing defences appropriate to the level and type of security threats identified. Further inputs may relate to computing resource overloads, the orchestration processor generating a shell script appropriate to the available resources.

The invention may be implemented by a computer system including a processor and memory storing computer program code for performing the steps of the process. The invention also extends to a computer program element comprising computer program code to, when loaded into a computer system and executed thereon, cause the computer to perform the process.

In particular, this invention provides for an orchestrator to receive and interpret external inputs such as event logging (security threats, network overloads etc), in addition to manual inputs, to generate virtualised and/or containerised processes.

The invention requires only the basic container commands to be understood by the user to deploy a safe container. A user can either specify a profile or can use a default profile to define the security and configuration. A container can be deployed that complies with the profile without the need of complex instructions, and apply controls and constraints before deployment, and indeed preventing deployment in high threat locations. It allows the use of 'standard' container APIs without the complexity of new instructions and procedures for the user. The invention can provide an orchestrator that not only applies vulnerability detection but can apply other countermeasures such as deployment or migration of containers during attacks to lesser prone infrastructure, and allows the orchestration of non-container tools to provide security and resilience.

BRIEF DESCRIPTION OF THE DRAWINGS

An embodiment of the Invention will now be described, by way of example, with reference to the Figures, in which.

DETAILED DESCRIPTION OF PRESENT EXAMPLE EMBODIMENTS

The embodiment enables containers to be deployed and operated securely and efficiently based on policy. At the core of the embodiment is a container orchestrator that combines live security threats, network and compute status and static security pre-requisites to deploy, operate and re-deploy containers and their dependencies to comply with a customer expectation. By introducing new and sometimes existing components the embodiment addresses security and network issues within containers.

This embodiment allows the use of standard application programming interfaces (APIs). System managers can set policies that are implemented across all deployments. It allows more efficient and secure deployment of containers. Service Level Management techniques can be applied to containers to manage compute, memory, storage and network during the runtime. Hot standby features can be offered to bring in a replacement container in the event that a primary container fails.

The embodiment provides a single view of all deployed assets. New physical or virtual servers can be brought into operation and used as an extension to the container computing pool. It allows reuse of existing visualised network and security invested.

Figure 1:
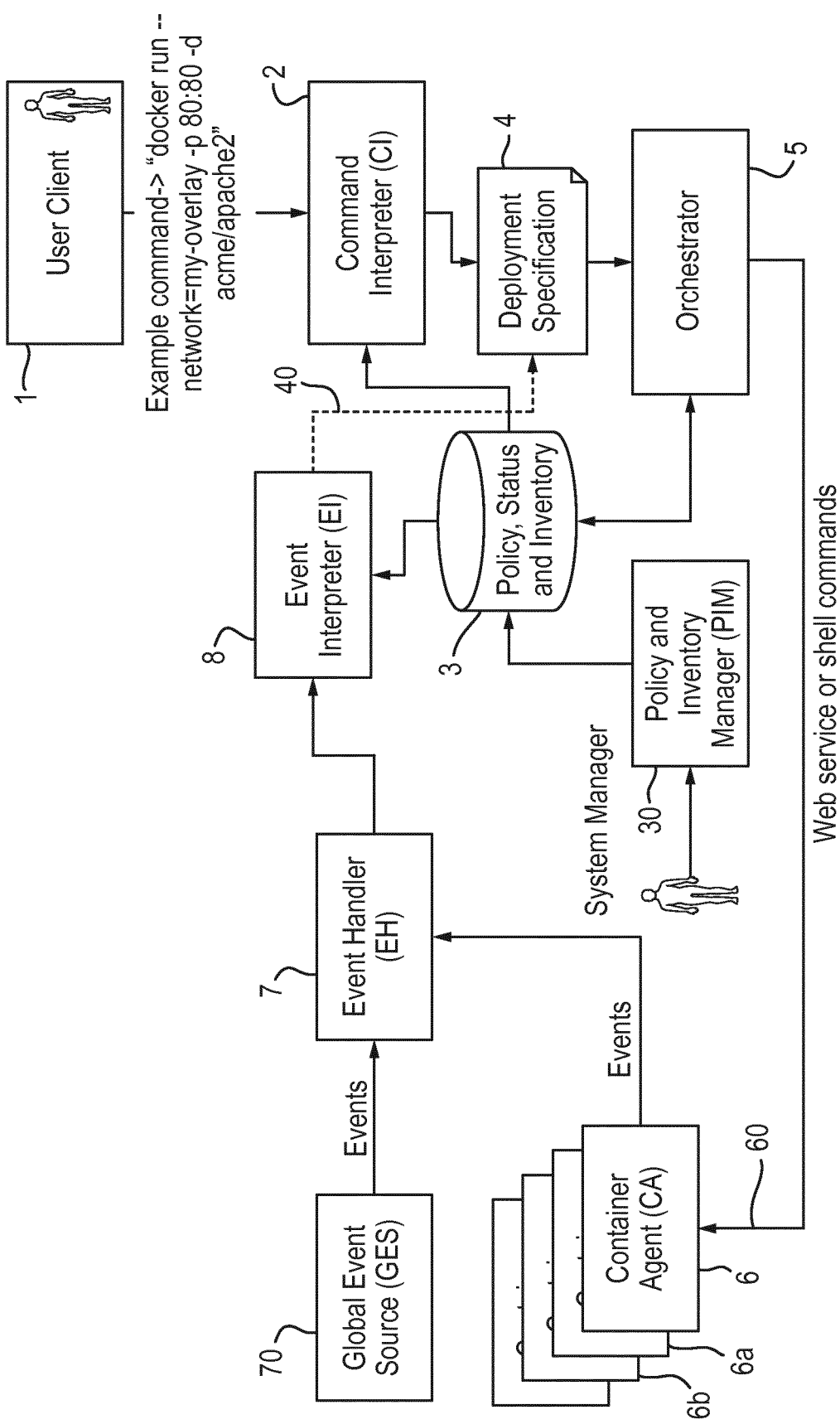
FIG. 1 depicts a high-level view of the system architecture, showing the flow of information and events through each of the components.

As depicted in FIG. 1, the embodiment comprises the following components. A Command Interpreter 2 interprets user commands delivered through a user interface 1, using data retrieved from a store 3 relating to policy, status and resources to build a deployment specification 4. The Command Interpreter 2 processes standard container commands received over the user interface 1 into a more sophisticated deployment description/specification 4 that takes into account preferences or settings defined by a predefined default profile, modified according to a user-specific profile stored in a local file and/or stored centrally 3. For example the profile may be flagged as vulnerable to malware. Other factors such as minimum bit rate, latency etc may also be included. The Command Interpreter 2 may also have inputs 40 from an event interpreter 8 providing live security information, such as, network load or a measure of the likelihood of a malware attack, and combines this with profile information to determine the resources to use and updates the deployment specification.

The deployment specification 4 is implemented by an Orchestrator 5. On receiving the complete deployment descriptor 4, the orchestrator generates a shell script 60 that will be run on a Virtualisation agent 6. The orchestrator 5 can issue commands to the Virtualisation agent 6 via a web service or via secure shell (SSH) cryptographic commands.

Figure 2:
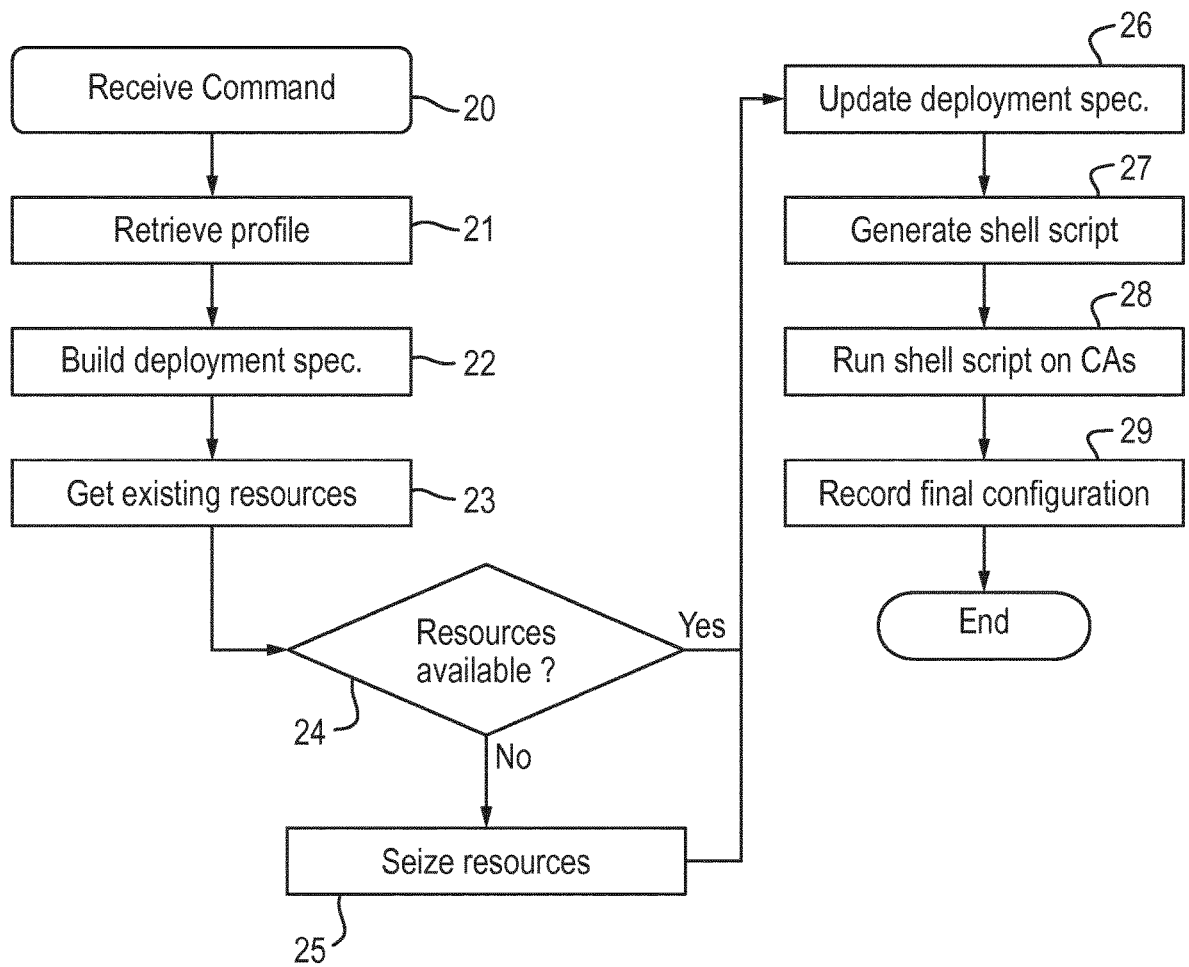
FIG. 2 depicts the flow of events when a container starts.

The process operates as depicted in the flow chart of FIG. 2. The process starts when a command 20 is received by the user interface 1. The command interpreter 2 responds to the command by retrieving a user profile from the store 3 (step 21) and constructs a suitable deployment specification 4 (step 22). Suitable resources, either existing or new, are requested from the inventory 3 (step 23) and the deployment specification 4 is updated (step 26).

If the inventory 3 identifies that inadequate resources are available to meet the request (step 24), remedial measures are taken, which may include taking over resources from other containerised applications that are not running or have a lower priority (step 25), or revising the deployment specification (step 22 repeated) to meet the available resources.

The deployment specification 4 generated by the command interpreter 2 is passed to the orchestrator 5 that then generates a shell script (step 27) that can be applied to the Virtualisation agent 6 to deploy the container (step 28). The results of deployment actions are recorded in the inventory 3 (step 29). The inventory data 3 can be used for later modification of a service (step 23) or removal of a service.

An example shell script 60 identifies input and output ports, create connections with other containers, configure the elements used in the container and initiate the functions, reporting the CPU and memory usage of the containered function to the inventory 3, to record allocation of resources to new or modified containers. The inventory store 30 also has provision for manual inputs through a user interface 30 for users and managers to view deployments and create profiles The Virtualisation agents 6, 6a, 6b etc, one of which is depicted in greater detail in FIG. 3 comprise a central processing application programming interface (API) 69 co-ordinating the operation of a number of processors 61-66 (sometimes known as "daemons") featuring monitoring, extended networking, vulnerability scanning and management components, under the control of the shell script 60 delivered from the orchestrator, and any other standard scripts 68 maintained by the agent 6. A container daemon (processor) 61 such as Docker or Rocket is hosted on a physical host or virtual machine, and generates the required container functions according to the shell script 60 received from the orchestrator, and any internal scripts. The Virtualisation agent 6 also provides extra capabilities such as virtual switches 62 and virtual private network (VPN) capabilities 63 for extended networking, virtualisation tools (64) configuration elements 65 and intrusion tools 66 that allow for more secure and robust deployment and operation of containers. The Virtualisation agent 6 also provides an event manager interface 67 that extracts details such as network monitoring, container daemon processing load, and security logs from data for handling by an event management system 7.

Figure 3:
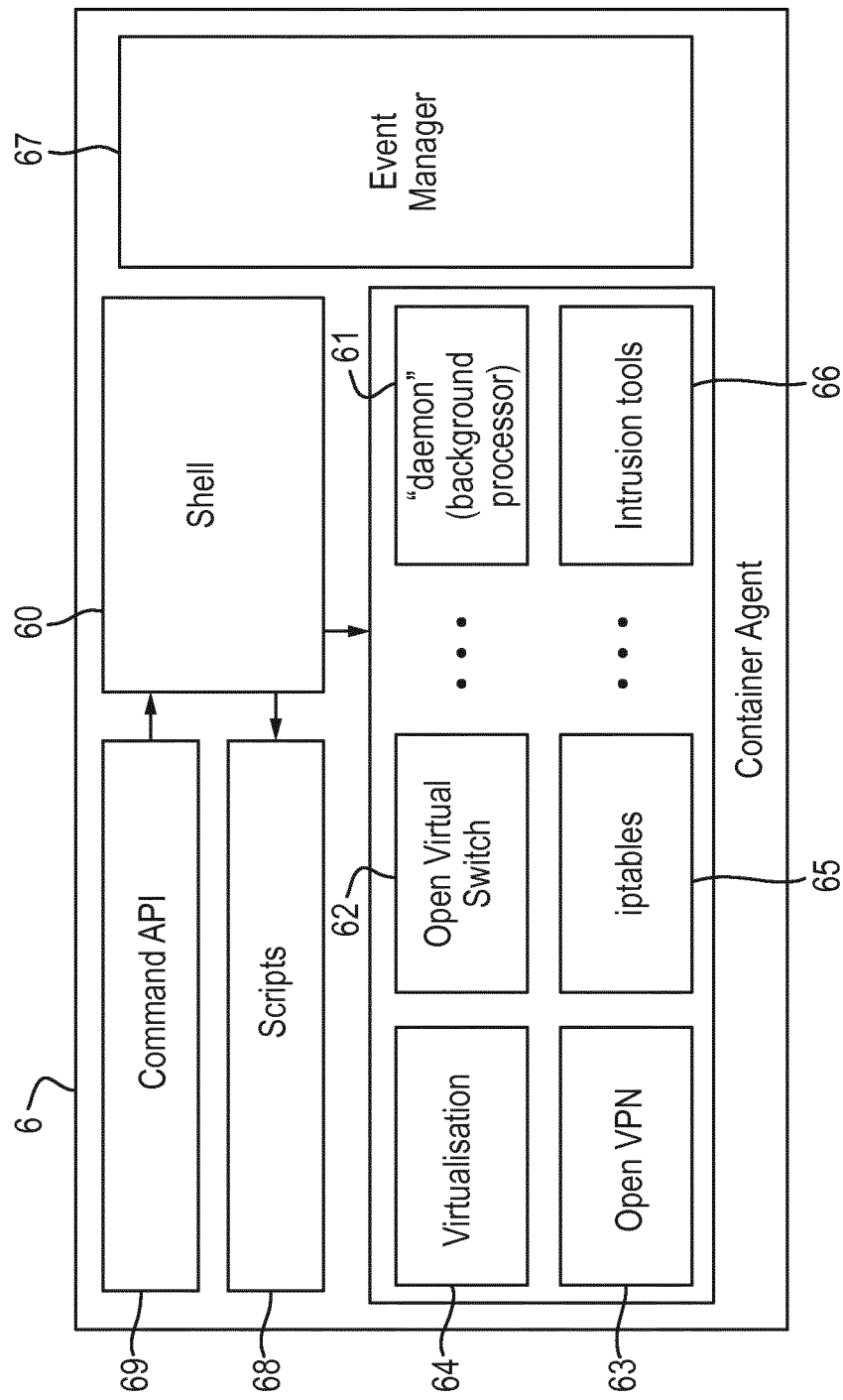
FIG. 3 depicts a high-level view architecture of a virtualisation agent generated according to the embodiment.

The shell script 60 executes commands to perform actions on the other components 62-68 depicted in FIG. 3. The rules for operating iptables 65 are also set through the Shell. The Event Manager 67 extracts security logs, container logs, and network information from the containers and sends the required data to the Event management system 7 (FIG. 1).

The Event manager 67 also provides a registration or deregistration facility that notifies the Event management system 7 and subsequently Event Interpreter 8 of the Virtualisation agent's capability. A heartbeat event may be sent periodically to prove that services are still running well. The Virtualisation agent 6 also has responsibilities for restarting failed containers.

An event management system 7 comprises components for receiving and logging events, both reported by the virtualisation agents 6, 6a, 6b and also external events such as attacks on data centres and networks, reported through an external interface 70. These events are reported to an Event Interpreter 8, which is a component for determining actions/commands based on the events reported by the event management system 7 and developing further deployment specifications 4 to be applied by the orchestrator 5.

Inputs from the event interpreter 8 are also used to provide data relating to live loads on resources, and any security threats, to determine what resources are to be used. In particular, if a threat is perceived, stronger protection systems may be required, such as greater encryption, using more resources.

In a similar manner to the command interpreter 2, the event interpreter 8 handles incoming events such as Registration of new virtualisation agents 6, 6a, 6b, loss of virtualisation agents, recovery of virtualisation agents, security threats to the system, region or individual virtualisation agents, and failure or overload of networks or containers. In a similar approach to the Command interpreter, a deployment script 40 is first created that is validated against existing resources. The deployment script can be sent to the orchestrator 5 to restart virtualisation agents 6, 6a, etc, or apply further security or network constraints. For instance, if a port scanning or hacking attack is detected on a virtualisation agent, then that virtualisation agent may be suspended and a new one installed and configured to replace it. If a security alert is received from an external source 70, countermeasures can be applied autonomously or on instruction from the orchestrator, as specified in the policy 3.

Such countermeasures can be executed through the Shell script 60 commands, which implement actions or apply rules to the other components, for example to change the rules in the iptables 65, execute specified scripts, or restart an individual container. This allows the virtualisation agent 6, on detecting a suspect Structured Query Language (SQL) command, to remove the source of the attack locally. Depending on the nature of the threat, the virtualisation agent may apply countermeasures autonomously, or it may prepare a script ready to run on instruction from the orchestrator 5 if it subsequently determines that the instructions need to be executed.

The invention claimed is:

1. A computer system including a processor and memory storing computer program code for orchestrating containerized processes such that upon execution of the computer program code by the processor, the computer system has a configuration comprising:
   a specification compiler configured to interpret user inputs and user profile data retrieved from a data store, to compile a deployment specification specifying functions to be run by a containerised process,
   an orchestration processor configured to generate a shell script comprising instructions to perform the containerised process having the functions specified by the specification compiler,
   a virtualisation agent configured to run the shell script instructions on a host virtualisation container, the host virtualisation container comprising computer resources associated with the orchestration processor, and
   an event interpreter configured to identify security threats based on events reported by an event management system, the events reported by the event management system including (i) events reported by the virtualisation agent via an event manager interface and (ii) external events reported via an external interface,
   wherein the orchestration processor is responsive to the event interpreter to modify the shell script subsequent to initial deployment in accordance with the events reported by the event management system to adapt the containerised process to provide defenses appropriate to the identified security threats.

2. The computer system according to claim 1, wherein the orchestration processor is arranged to generate the modified shell script providing the defenses appropriate to a level and type of the identified security threats.

3. The computer system according to claim 1, in which the event interpreter is arranged to identify resource overloads, and the orchestration processor is arranged to generate the modified shell script appropriate to available resources.

4. A method of operating a computerised system to generate a containerised processing function the method comprising:
   interpreting user commands and user profile data to build a deployment specification specifying functions to be run by a containerised process,
   generating a shell script comprising instructions to perform a containerised process having the functions specified in the deployment specification,
   running the shell script on a host virtualisation container to run the containerised process, identifying security threats based on events reported by an event management system, the events reported by the event management system including (i) events reported by the host virtualisation container via a first interface and (ii) external events reported via a second interface, and modifying the shell script by an orchestration processor to modify the containerised process subsequent to initial deployment in response to inputs in accordance with the events reported by the event management system to provide defenses appropriate to the identified security threats.

5. A method according to claim 4, wherein the orchestration processor generates the modified shell script providing the defenses appropriate to a level and type of the identified security threats.

6. A method according to claim 4, in which the inputs relate to computing resource overloads and the orchestration processor generates the modified shell script appropriate to available resources.

7. A non-transitory computer-readable storage medium storing computer program code to, when loaded into a computer system and executed thereon, cause the computer system to perform operations comprising:

interpreting user commands and user profile data to build a deployment specification specifying functions to be run by a containerised process, generating a shell script comprising instructions to perform a containerised process having the functions specified in the deployment specification, running the shell script on a host virtualisation container to run the containerised process, identifying security threats based on events reported by an event management system, the events reported by the event management system including (i) events reported by the host virtualisation container via a first interface and (ii) external events reported via a second interface, and modifying the shell script by an orchestration processor to modify the containerised process subsequent to initial deployment in response to inputs in accordance with the events reported by the event management system to provide defenses appropriate to the identified security threats.

8. The non-transitory computer-readable storage medium of claim 7, wherein the computer is caused to perform the operations further comprising:

monitoring for the events to be reported by the host virtualisation container while the shell script is run on the host virtualisation container to run the containerised process.

9. The non-transitory computer-readable storage medium of claim 7, wherein the computer is caused to perform the operations further comprising:

combining the user profile data with (i) the events reported by the host virtualisation container via the first interface and (ii) the external events reported via the second interface to update the deployment specification to modify the shell script.

10. The non-transitory computer-readable storage medium of claim 7, wherein applying the defenses includes applying countermeasures including deployment or migration of the host virtualisation container.

11. The computer system according to claim 1, wherein the virtualisation agent is further configured to monitor for the events to be reported by the virtualisation agent while the shell script is run on the virtualisation agent to run the containerised process.

12. The computer system according to claim 1, wherein the event interpreter is further configured to combine the user profile data with (i) the events reported by the virtualisation agent via the event manager interface and (ii) the external events reported via the external interface to update the deployment specification to modify the shell script.

13. The computer system according to claim 1, wherein providing the defenses includes applying countermeasures including deployment or migration of the host virtualisation container.

14. A method according to claim 4, further comprising monitoring for the events to be reported by the host virtualisation container while the shell script is run on the host virtualisation container to run the containerised process.

15. A method according to claim 4, further comprising combining the user profile data with (i) the events reported by the host virtualisation container via the first interface and (ii) the external events reported via the second interface to update the deployment specification to modify the shell script.

16. A method according to claim 4, wherein applying the defenses includes applying countermeasures including deployment or migration of the host virtualisation container.

* * * * *